United States Patent
Takahashi et al.

(10) Patent No.: US 6,171,557 B1
(45) Date of Patent: Jan. 9, 2001

(54) SYSTEM FOR EXHAUST GAS PURIFICATION

(75) Inventors: Akira Takahashi, Nagoya; Naomi Noda, Ichinomiya; Takuya Hiramatsu, Nagoya; Yukinari Shibagaki, Kounan, all of (JP)

(73) Assignee: NGK Insulators, Ltd. (JP)

( * ) Notice: Under 35 U.S.C. 154(b), the term of this patent shall be extended for 0 days.

(21) Appl. No.: 09/045,124

(22) Filed: Mar. 20, 1998

(30) Foreign Application Priority Data

Mar. 26, 1997 (JP) .................................................. 9-072922

(51) Int. Cl.$^7$ ............................... B01D 53/94; B01J 35/04
(52) U.S. Cl. .......................... 422/177; 422/171; 422/180; 60/297
(58) Field of Search ...................................... 422/171, 177, 422/180, 179; 60/299–303, 297

(56) References Cited

U.S. PATENT DOCUMENTS 5,538,697  7/1996  Abe et al. ............................. 422/171

FOREIGN PATENT DOCUMENTS

| 0 639 699 A2 | 2/1995 | (EP) . |
| 0 661 098 A2 | 7/1995 | (EP) . |
| 7-124467 | 5/1995 | (JP) . |
| 7-155613 | 6/1995 | (JP) . |

*Primary Examiner*—Hien Tran
(74) *Attorney, Agent, or Firm*—Parkhurst & Wendel, L.L.P.

(57) ABSTRACT

A system for exhaust gas purification disposed in the exhaust pipe of an internal combustion engine, which includes a zeolite as adsorbent component capable of adsorbing the hydrocarbons present in the exhaust gas emitted from the engine and a catalyst capable of reducing the harmful substances present in the exhaust gas; the system satisfies the following conditions: a/c=3 to 50 cc/g, wherein a is the total volume of the pores of diameters of 10 Å or smaller possessed by the zeolite as measured using $N_2$, and c is the total amount of the hydrocarbons emitted from the engine during the period of 140 seconds from the start of the engine when the engine is operated in accordance with the LA-4 mode of FTP, thereby the adsorption capacity of the zeolite used as a HC adsorbent is optimized against the amount of the HC discharged from an engine during a certain period of the cold start so as to adsorb and purify the HC effectively.

18 Claims, 2 Drawing Sheets

SYSTEM FOR EXHAUST GAS PURIFICATION

BACKGROUND OF THE INVENTION (1) Field of the Invention

The present invention relates to a system for exhaust gas purification, capable of effectively purifying the harmful substances present in the exhaust gas emitted from an internal combustion engine, particularly the hydrocarbons discharged from the engine in a large amount during the cold start.

(2) Description of Related Art

Active researches and developments have heretofore been made on systems for exhaust gas purification, used for purifying the harmful substances present in exhaust gas from automobile engines, such as nitrogen oxides ($NO_x$), carbon monoxide (CO), hydrocarbons (HC) and the like. In recent years, as the regulation on exhaust gas has become stricter, the purification of HC during engine start (cold start) has become an important technical task.

The reason is as follows. During the cold start of engine when the temperature of exhaust gas from engine is low, the catalyst disposed in exhaust pipe of engine does not reach its light-off temperature and has a low purification ability. Moreover, during this period, as compared with the period of continuous operation of engine, a large amount of HC is discharged from the engine. As a result, the HC discharged during the cold start occupies a large proportion of the total harmful substances discharged from the engine and needs to be removed.

As one means for achieving the above-mentioned technical task, there has been proposed a system for exhaust gas purification disposed in the exhaust pipe of an internal combustion engine, comprising not only a catalyst but also zeolite (as adsorbent) having an adsorbability for HC. In this system, zeolite is used to adsorb a large amount of the unburnt HC discharged from the engine during the cold start, temporarily for the period from the start of catalyst heating to the activation of catalyst.

In the above system for exhaust gas purification using zeolite, its performance varies greatly depending upon the HC adsorption capacity of the zeolite used. Also, the HC amount discharged from an internal combustion engine during the cold start varies greatly depending upon the engine used. Consequently, the performance of an exhaust gas purification system using a zeolite having a certain HC adsorption capacity varies greatly depending upon the engine in which the system is used. Therefore, in order to effectively adsorb and purify a large amount of the HC discharged from an engine during its cold start, it is necessary to allow the exhaust gas purification system disposed in the engine, to contain a zeolite having an adsorption capacity allowing for effective adsorption of the HC discharged from the engine during a certain period of cold start.

However, there is hardly known a system for exhaust gas purification in which sufficient consideration is made of the relation between the amount of HC discharged during cold start and the HC adsorption capacity of zeolite.

SUMMARY OF THE INVENTION

In view of the above situation, the present invention has an object of providing a system for exhaust gas purification, wherein the adsorption capacity of the zeolite used as a HC adsorbent component is optimized against the amount of the HC discharged from an engine during a certain period of the cold start and thereby the HC is effectively adsorbed and purified.

According to the present invention, there is provided a system for exhaust gas purification (the first system for exhaust gas purification) disposed in the exhaust pipe of an internal combustion engine, comprising a zeolite as adsorbent component capable of adsorbing the hydrocarbons present in the exhaust gas emitted from the engine and a catalyst capable of reducing the harmful substances present in the exhaust gas, which system satisfies the following condition:

$$a/c = 3 \text{ to } 50 \text{ cc/g}$$

wherein a is the total volume of the pores of diameters of 10 Å or smaller possessed by the zeolite as measured using $N_2$, and c is the total amount of the hydrocarbons emitted from the engine during the period of 140 seconds from the start of the engine when the engine is operated in accordance with the LA-4 mode of FTP.

According to the present invention, there is also provided a system for exhaust gas purification (the second system for exhaust gas purification) disposed in the exhaust pipe of an internal combustion engine, comprising a zeolite as adsorbent component capable of adsorbing the hydrocarbons present in the exhaust gas emitted from the engine and a catalyst capable of reducing the harmful substances present in the exhaust gas, which system satisfies the following condition:

$$b/c = 2 \text{ to } 30 \text{ cc/g}$$

wherein b is the total volume of the pores of diameters of 10 Å or smaller possessed by the zeolite as measured using toluene, and c is the total amount of the hydrocarbons emitted from the engine during the period of 140 seconds from the start of the engine when the engine is operated in accordance with the LA-4 mode of FTP.

According to the present invention, there is also provided a system for exhaust gas purification (the third system for exhaust gas purification) disposed in the exhaust pipe of an internal combustion engine, comprising a zeolite as adsorbent component capable of adsorbing the hydrocarbons present in the exhaust gas emitted from the engine and a catalyst capable of reducing the harmful substances present in the exhaust gas, which system satisfies the following conditions:

$$a/c = 3 \text{ to } 50 \text{ cc/g}$$
$$b/c = 2 \text{ to } 30 \text{ cc/g}$$

wherein a is the total volume of the pores of diameters of 10 Å or smaller possessed by the zeolite as measured using $N_2$, b is the total volume of the pores of diameters of 10 Å or smaller possessed by the zeolite as measured using toluene, and c is the total amount of the hydrocarbons emitted from the engine during the period of 140 seconds from the start of the engine when the engine is operated in accordance with the LA-4 mode of FTP.

DETAILED DESCRIPTION OF THE PREFERRED EMBODIMENT

Figure 1:
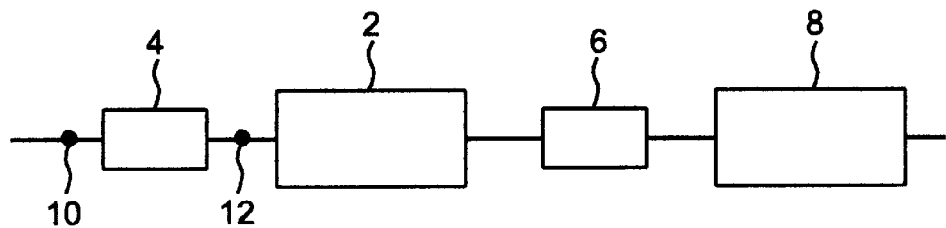
FIG. 1 is a schematic drawing showing the constitution of the present system for exhaust gas purification used in the Examples.

In the system for exhaust gas purification according to the present invention, it is intended that the adsorption capacity of the zeolite used as a HC adsopbent component, i.e. the volume of the pores capable of adsorbing HC, possessed by the zeolite is optimized against the amount of the HC emitted from an internal combustion engine during a certain period from the start of the engine so that the system can have an improved HC adsorbability and purifiability.

In order to achieve the intention, in the first system for exhaust gas purification according to the present invention, the following condition has been allowed to hold:

$a/c$=3 to 50 cc/g, preferably 5 to 40 cc/g, more preferably 10 to 30 cc/g wherein a is the total volume of the pores of diameters of 10 Å or smaller possessed by the zeolite as measured using $N_2$, and c is the total amount of the hydrocarbons emitted from the engine during the period of 140 seconds from the start of the engine when the engine is operated in accordance with the LA-4 mode of FTP.

Experiments by the present inventors revealed that the system constituted so as to satisfy the above condition of a/c can very effectively adsorb and purify the HC emitted from an internal combustion engine during the cold start.

When a/c is smaller than 3 cc/g, the zeolite in the system is unable to sufficiently adsorb the HC emitted in a large amount from an internal combustion engine during the cold start. Meanwhile, when a/c is larger than 50 cc/g, a cycle of "HC adsorption on zeolite→HC desorption from zeolite→purification of desorbed HC by catalyst" takes too long a time; in case that the engine is stopped in its actual operation before the completion of the cycle, the HC adsorbed on the zeolite remains undesorbed; when such engine operation is repeated, the pores of zeolite are saturated with HC, making impossible the adsorption of freshly emitted HC.

Further, when a/c is larger than 50 cc/g, the amount of zeolite used is large, incurring a high cost; in addition, the volume of the carrier used for supporting the zeolite becomes large, incurring a problem in mounting the resulting system in an engine. Furthermore, loading too large an amount of a zeolite on a carrier (e.g. a monolithic carrier) invites a high pressure loss. When, for example, a blowing-through hole is formed in the monolithic carrier as described later, to avoid the high pressure loss, the flow of exhaust gas takes place mostly in the blowing-through hole and the amount of the exhaust gas flowing through the supported zeolite portion becomes small, resulting in reduced HC adsorption.

In specifying the above condition of a/c in the first system for exhaust gas purification, there was taken, as c, the total amount of the hydrocarbons emitted from an internal combustion engine in the period of 140 seconds from the start of the engine when the engine is operated in accordance with the LA-4 mode of FTP. The reason is as follows. In the FTP test (LA-4 mode) conducted for the stricter emission control of the U.S., 70–80% of the total HC emission unpurifiable with any ordinary three-way catalyst is discharged during the cold start of engine in the period of 140 seconds from the start of engine, i.e. within the first hill of Bag-1; therefore, the reduction of the HC discharged in this period is an important task in exhaust gas purification.

In the first system for exhaust gas purification, $N_2$ was used for measurement of the pore volume of zeolite. The reason is that $N_2$ can enter even the small pores having diameters of about 0.35 nm at the temperature of liquid nitrogen and, therefore, by using $N_2$, it is possible to measure the volume of pores including those small pores which only molecules of small hydrocarbons (e.g. $C_{2-3}$ hydrocarbons) out of the total HC contained in exhaust gas can enter.

Further, in the first system for exhaust gas purification, the zeolite pores of diameters of 10 Å or smaller were measured. The reason is that the zeolite pores of diameters of larger than 10 Å, unlike the zeolite pores of diameters of 10 Å or smaller, are unable to effectively adsorb HC such as toluene and the like in a gas (e.g. automotive exhaust gas) that comprises $N_2$ and $CO_2$ as major components and wherein HC is present in a small amount of 1% or less and the concentration of substances to be adsorbed is low.

Next, description is made on the second system for exhaust gas purification according to the present invention. In the second system for exhaust gas purification according to the present invention, the following condition has been allowed to hold:

$b/c$=2 to 30 cc/g, preferably 2 to 20 cc/g, more preferably 5 to 20 cc/g wherein b is the total volume of the pores of diameters of 10 Å or smaller possessed by the zeolite as measured using toluene, and c is the total amount of the hydrocarbons emitted from the engine during the period of 140 seconds from the start of the engine when the engine is operated in accordance with the LA-4 mode of FTP.

Experiments by the present inventors revealed that the system constituted so as to satisfy the above condition of b/c, similarly to the first system for exhaust gas purification, can very effectively adsorb and purify the HC emitted from an internal combustion engine during the cold start. When b/c deviates from the above range, there arise the same problems as in the first system for exhaust gas purification.

In specifying the above condition of b/c in the second system for exhaust gas purification, there was taken, as c, the total amount of the hydrocarbons emitted from an internal combustion engine in the period of 140 seconds from the start of the engine when the engine is operated in accordance with the LA-4 mode of FTP. The reason is the same as in the first system for exhaust gas purification.

Toluene was used for measurement of the pore volume of zeolite. The reason is that by using toluene, it is possible to measure the volume of the pores of relatively large diameters capable of adsorbing, among various hydrocarbons present in the exhaust gas of engine, only HC molecules of toluene ($C_7$) or larger size [these HC molecules are easily adsorbed even in an engine exhaust gas containing water (moisture), are contained in an engine exhaust gas in a large amount, and are a main target of adsorption by adsorbent]. Small HC molecules (e.g. $C_{2-3}$ HC molecules) are not substantially adsorbed on an ordinary zeolite in an engine exhaust gas containing water (moisture) and their concentration in exhaust gas during engine cold start is relatively low; therefore, in the second system for exhaust gas purification, it is aimed to mainly adsorb relatively large HC molecules as mentioned above. Further in the second system for exhaust gas purification, the zeolite pores of diameters of 10 Å or smaller are measured. It is for the same reason as in the first system for exhaust gas purification.

Successively, description is made on the third system for exhaust gas purification according to the present invention. In the third system for exhaust gas purification, the following conditions have been allowed to hold:

a/c=3 to 50 cc/g, preferably 5 to 40 cc/g, more preferably 10 to 30 cc/g b/c=2 to 30 cc/g, preferably 2 to 20 cc/g, more preferably 5 to 20 cc/g wherein a is the total volume of the pores of diameters of 10 Å or smaller possessed by the zeolite as measured using $N_2$, b is the total volume of the pores of diameters of 10 Å or smaller possessed by the zeolite as measured using toluene, and c is the total amount of the hydrocarbons emitted from the engine during the period of 140 seconds from the start of the engine when the engine is operated in accordance with the LA-4 mode of FTP.

The third system for exhaust gas purification has both of the feature of the first system for exhaust gas purification and the feature of the second system for exhaust gas purification. In the third system for exhaust gas purification, therefore, the zeolite used therein can favorably adsorb not only HC of relatively small molecules but also HC of large molecules and shows an excellent adsorbability particularly for the HC of large molecules (toluene and larger HC) present in the engine exhaust gas in a large amount.

The zeolite used as an adsorbent component in the first to third systems for exhaust gas purification is disposed in an exhaust pipe preferably in the form of an adsorbent comprising a monolithic carrier and a zeolite supported thereon. The catalyst used in the first to third systems for exhaust gas purification is preferably a catalyst comprising a monolithic carrier and a catalyst layer supported on the carrier, containing a catalyst component having a purifiability for the harmful substances present in the exhaust gas. The monolithic carrier is generally called a honeycomb structure and refers to a structure having passages (cells) surrounded by substantially uniform partition walls. The monolithic carrier is preferably made of cordierite, mullite or ferrite type stainless steel in view of the heat resistance and impact resistance.

The monolithic carrier constituting the adsorbent has a volume of preferably 0.5–4 l, more preferably 1–3 l, further preferably 1–2 l. When the volume of the monolithic carrier is smaller than 0.5, l the time in which the zeolite supported on the monolithic carrier contacts with an exhaust gas, is short and the adsorption of HC on zeolite tends to become insufficient. Meanwhile, when the volume of the monolithic carrier is larger than 4 l, there arises a problem in accommodating the resulting adsorbent in an exhaust pipe.

The monolithic carrier constituting the adsorbent also has a geometrical surface area (GSA) of preferably 10,000 to 100,000 $cm^2$, more preferably 20,000 to 100,000 $cm^2$, further preferably 20,000 to 70,000 $cm^2$. When the geometrical surface area of the monolithic carrier is smaller than 10,000 $cm^2$, the resulting adsorbent tends to have insufficient adsorbability for HC. Meanwhile, when the geometrical surface area is larger than 100,000 $cm^2$, problems tend to arise in pressure loss, impact resistance, etc.

The zeolite used as an adsorbent component may be any of a natural product and a synthetic product and there is no restriction as to the kind. However, a zeolite having a $SiO_2/Al_2O_3$ molar ratio of 50 or more is preferred for the heat resistance, durability and hydrophobicity. Specifically, at least one kind selected from ZSM-5, β-zeolite, USY and mordenite is preferred as the adsorbent component.

The zeolite may be used in one kind or in combination of two or more kinds. For example, ZSM-5 having relatively small pores of about 0.55 nm is advantageous for adsorption of small molecules (e.g. propene) but disadvantageous for adsorption of large molecules (e.g. toluene and xylene). In contrast, USY having relatively large pores of about 0.74 nm is disadvantageous for adsorption of small molecules (e.g. propene) but advantageous for adsorption of large molecules (e.g. toluene and xylene).

Thus, supporting of ZSM-5 and USY in admixture on a monolithic carrier is one preferred approach. Further, ZSM-5 and USY may be supported on a monolithic carrier in respective areas aligned in the flow direction of exhaust gas. In this case, it is preferred that ZSM-5 is supported upstream of USY because ZSM-5 can adsorb and hold HC up to higher temperatures than USY can.

β-Zeolite is the most preferred zeolite because (1) it has bimodal pores of about 0.55 nm and about 0.70 nm and can therefore adsorb both small molecules and large molecules relatively well and (2) it can adsorb a relatively large amount of HC per unit weight.

The zeolite may be used as an adsorbent component by itself but, in order to suppress coking on zeolite which takes place at the time of adsorption, it is preferred that at least one noble metal selected from Pt, Pd and Rh is supported on the zeolite because this arrangement allows for regeneration of zeolite without reduction in zeolite adsorbability. The preferred noble metal supported on the zeolite is Pd because Pd is most inexpensive and provides the highest regeneratability of zeolite.

The supporting of a noble metal on the zeolite is preferably conducted by ion exchange in view of the thermal stability of the noble metal-supported zeolite. The amount of the noble metal supported is preferably 5–150 $g/ft^3$ per unit volume of carrier in view of the cost of noble metal and the regeneratability of zeolite. In supporting a zeolite on a monolithic carrier, the zeolite may optionally contain 5–20% by weight of an inorganic binder such as $Al_2O_3$, $SiO_2$ or the like, whereby the zeolite can be strongly supported on the carrier without impairment of the HC adsorbability of the zeolite.

When a noble metal is supported on a zeolite, the noble metal imparts regeneratability to the zeolite as mentioned above and further has a catalytic action. However, the noble metal in zeolite tends to cause cohesion and may have insufficient catalyst durability. Therefore, when it is desired to impart a catalytic action to the zeolite, it is desirable to (1) allow the zeolite to contain a catalyst component comprising a heat-resistant oxide and a noble metal supported thereon (this catalyst component is the same one as used in the catalyst described later) or (2) form, on a zeolite layer, a layer containing the above catalyst component. (Hereinafter, the adsorbent obtained by allowing a zeolite to contain a catalyst component having a purifiability for the harmful substances present in an engine exhaust gas or by forming, on a zeolite layer, a layer containing a catalyst component having a purifiability for the harmful substances present in an engine exhaust gas, is referred to as "adsorbent-catalyst" in some cases.)

The above adsorbent, since it contains a durable catalyst component, can show a purifiability for the harmful substances present in an engine exhaust gas, even during the steady-state operation of the engine after cold start. Since the above catalyst component can suppress coking of zeolite, it is not necessary to separately add, to the zeolite, a noble metal for suppression of coking.

It is preferable to allow the zeolite to contain at least one ion selected from the ions of the group IB elements (Cu, Ag and Au) of the periodic table, because the ion can increase the HC adsorbability of zeolite. The content of the ion in zeolite is preferably 20% or more, more preferably 40% or more based on the Al atom of zeolite, because with a small content of the ion, the resulting increase in the HC adsorbability of zeolite is small. The ion may be used in the zeolite in any desired combination with the above-mentioned noble metal.

Desirably, at least one ion selected from the ions of Mg, Ca, Sr, Ba, Y, La, Ti, Ce, Mn, Fe, Co, Cr, Ni and Zn, preferably at least one ion selected from the ions of Mg, Ca, Fe and Cr, is added to the zeolite besides the ion of the group IB element because the addition can increase the heat resistance of zeolite.

One preferred example of the adsorbent-catalyst wherein a catalyst component-containing layer is formed on a zeolite layer is an multilayered adsorbent-catalyst obtained by forming, on a monolithic carrier, a high-silica zeolite (e.g. ZSM-5, USY or β-zeolite) as a first layer and then forming thereon a noble metal-supported $Al_2O_3$—$CeO_2$ compound oxide as a second layer.

In such a multilayered adsorbent-catalyst, the $Al_2O_3$ (which is a main component of the second layer) acts as a predrier and selectively adsorbs the $H_2O$ contained in the exhaust gas emitted during the cold start of the engine, and enhances the HC adsorbability possessed by the first layer. Further, with an increase in exhaust gas temperature, heating of the adsorbent-catalyst starts from the catalyst component-containing second layer (the outermost layer) and, at a timing when the zeolite component of the first layer desorbs the adsorbed HC, the catalyst component of the second layer functions favorably. Incidentally, the catalytic action of the second layer increases remarkably by, at the above timing of HC desorption, adding an oxidizing gas or controlling the volume ratio of air for combustion and fuel to make the exhaust gas composition oxygen-excessive.

The adsorbent-catalyst functions relatively favorably even when the noble metal-supported catalyst component and a zeolite are supported on a monolithic carrier in admixture and not in a multilayer. The weight ratio of the zeolite and the catalyst component is 50:50 to 85:15, and the amount of the zeolite is preferably more than the amount of the catalyst component. The preferred amount to be supported on the monolithic carrier is 0.05–0.4 g/cc (zeolite) and 0.02–0.20 g/cc (catalyst component).

Figure 3:
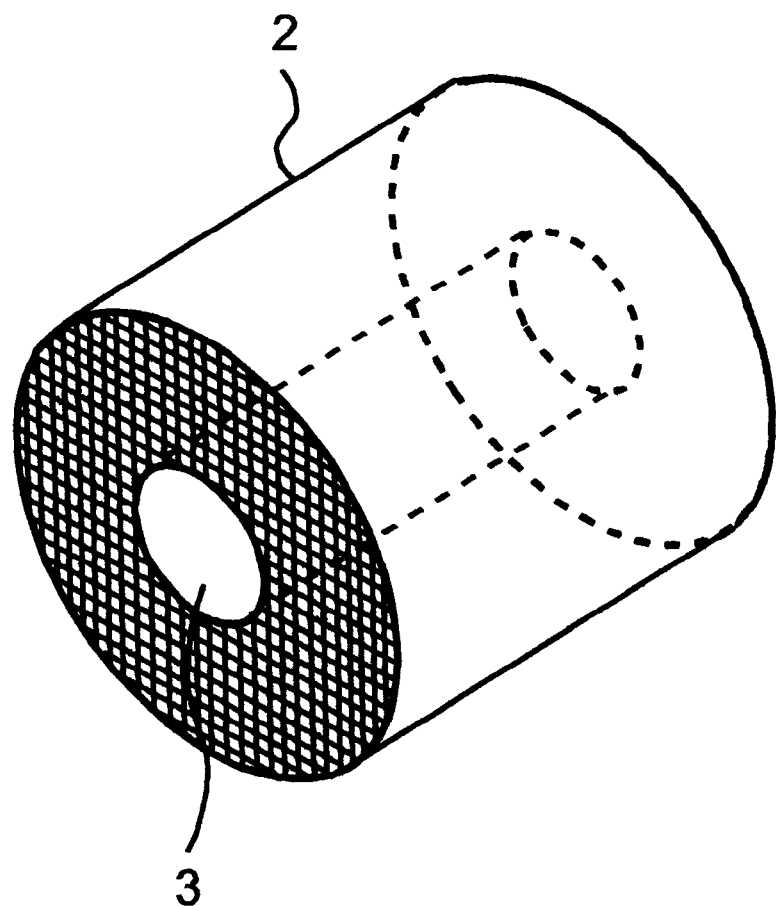
FIG. 3 is a drawing showing an adsorbent with a blowing-through hole with a diameter larger than the diameter of the cells of a monolithic carrier.

It is preferred to (1) allow the adsorbent to have a portion of low pressure loss by changing the length or porosity of part of the adsorbent or (2) form, in the adsorbent, a blowing-through hole having a diameter larger than the diameters of the passages (cells) of the monolithic carrier, to allow part of the exhaust gas to blow through the hole, because (1) or (2) accelerates the warm-up of the catalyst provided downstream of the adsorbent and enhances the efficiency of purification of desorbed HC. FIG. 3 shows adsorbent 2 having a blowing-through hole 3.

The diameter of the blowing-through hole is preferably 50 mm or less in view of the strength of the carrier; the diameter is more preferably 40 mm or less in order to suppress the reduction in amount of HC adsorption, caused by blowing-through of excessive amounts of exhaust gas. Conversely, when the diameter of the blowing-through hole is too small, the warm-up of the catalyst provided downstream of the adsorbent is insufficient. Therefore, the diameter is preferably 10 mm or more.

The catalyst used in the present system for exhaust gas purification to favorably remove the harmful substances (e.g. HC, CO and $NO_x$) emitted from an internal combustion engine, preferably comprises, as catalyst components, at least one noble metal selected from Pt, Pd and Rh and a heat-resistant oxide having the noble metal supported thereon. The catalyst preferably comprises a monolithic carrier made of a heat-resistant inorganic substance and a catalyst layer containing the above catalyst components, supported on the monolithic carrier.

The heat-resistant oxide used for supporting a noble metal thereon includes heat-resistant oxides such as $Al_2O_3$, $SiO_2$, $TiO_2$, $ZrO_2$ and the like and compound oxides thereof. In particular, $Al_2O_3$ having a specific surface area of 100 $m^2$/g or more is preferable, because a noble metal is supported thereon in a highly dispersed state and higher low-temperature light-off performance and higher heat resistance are obtained. Addition, to the heat-resistant oxide, of 5–30% by weight of an oxide having oxygen storability, such as $CeO_2$, $La_2O_3$, $CeO_2$–$ZrO_2$ or the like is preferred because a higher steady-state activity is obtained. The total amount of noble metal in catalyst is preferably 20–300 g/$ft^3$ (carrier).

In the system for exhaust gas purification according to the present invention, it is preferred that at least one such catalyst is disposed downstream of the above-mentioned adsorbent. The catalyst disposed downstream of the adsorbent contains preferably Pt and/or Pd both of high oxidizability, particularly preferably Pd which is superior in low-temperature light-off performance. Formation of only a catalyst layer containing 40–250 g/$ft^3$ of Pd on a monolithic carrier is one preferred catalyst example.

The ratio of the volume of the catalyst disposed downstream of the adsorbent, i.e. the downstream catalyst and the volume of the adsorbent is preferably 1:1 to 1:15. When the volume of the adsorbent is smaller than the volume of the downstream catalyst, the heat capacity of the downstream catalyst is larger than that of the adsorbent and consequently the temperature rise of the downstream catalyst is slow. When the volume of the adsorbent is larger than 15 times the volume of the downstream catalyst, the adsorbent disposed upstream acts as a heat sink and the temperature rise of the downstream catalyst is prevented.

In the present system for exhaust gas purification, it is preferred that at least one catalyst is disposed upstream of the adsorbent, besides the downstream catalyst. This upstream catalyst preferably contains Pd which is superior in low-temperature light-off performance, and the presence of Pd in a relatively high concentration of 40–250 g/$ft^3$ is very effective.

In the present system for exhaust gas purification, it is also preferred that at least one electrical heater (hereinafter referred to as "EH") is disposed in an exhaust pipe in order to achieve the early activation of the catalyst. The EH is preferably constituted by a honeycomb structure made of a heat-resistant metal (e.g. ferrite) and electrodes attached to the honeycomb structure for electrification thereof, in view of the pressure loss and heat-resistance. This EH is preferably used in the form of an electrically heatable catalyst (hereinafter referred to as "EHC") which comprises the EH and a catalyst layer formed thereon, made of a noble metal-containing heat-resistant inorganic oxide, because, with the EHC, the electricity required for heating of EH can be reduced owing to the reaction heat of catalyst.

In one preferred embodiment of the present system for exhaust gas purification, the EHC is disposed downstream of the adsorbent to promote the purification of desorbed HC. When the EHC is small-sized, it is preferred to dispose the catalyst downstream of the EHC but close thereto to effectively utilize the electrically generated heat and reaction heat of the EHC.

In conducting exhaust gas purification during the cold start of engine by using the present system for exhaust gas purification, when, for a certain period during the cold start, an oxidizing gas (e.g. secondary air) is introduced into the exhaust gas from upstream of the catalyst or the ratio of the amount of air for combustion and the amount of fuel is changed so as to increase the oxygen amount in exhaust gas, the combustion reaction on catalyst is promoted and the early light-off of catalyst is achieved. The above introduction of oxidizing gas or the above change of the ratio of the amount of air for combustion and the amount of fuel for increased oxygen supply is preferred because as the HC adsorbed on the adsorbent begins to be desorbed with the temperature rise of the adsorbent caused by the heat of exhaust gas, the HC concentration in exhaust gas increases and the oxygen required for purification (combustion) of HC becomes short.

In the present invention, both of a system for exhaust gas purification of "by-pass type" and a system for exhaust gas purification of "in-line type" are effective. The by-pass type is one in which an adsorbent or an adsorbent-catalyst and a catalyst are disposed in a main exhaust pipe and a by-pass pipe attached to the main pipe, and the in-line type is one in which an adsorbent or an adsorbent-catalyst and a catalyst are disposed in one exhaust pipe. However, the in-line type is particularly effective because the HC desorbed from the adsorbent (or the adsorbent-catalyst) must be efficiently purified by the catalyst.

In the present specification, the pore volume of zeolite was measured by one of the following methods. When two or more kinds of zeolites were used, the pore volumes of individual zeolites were separately measured by one of the following methods and they were totalled.

Measurement of Pore Volume Using $N_2$

The total volume of the pores having diameters of 10 Å or smaller, possessed by a zeolite was determined from the following formula, using the $N_2$ saturation adsorption of the zeolite at liquid nitrogen temperature (77 K).

Pore volume (cc/g) of zeolite as measured using $N_2$=$N_2$ saturation adsorption (g/g)/$N_2$ density (0.808 g/cc)

Incidentally, the $N_2$ saturation adsorption was determined from the following formula, using the total surface area of the zeolite measured by the use of Flowsorb 2300 (a specific surface area tester manufactured by Micromeritechs).

$N_2$ saturation adsorption (g/g)=S×B×M/[(1−P/Ps)×A×s×−w×B]

wherein
S: total surface area ($m^2$) of zeolite,
w: weight (g) of zeolite,
B: 22,413 $cm^3$ (volume of gas at normal temperature (0° C.) and normal pressure (1 atm.)),
P/Ps: partial pressure of $N_2$ (P/Ps=0.301 in measurement in the following Examples),
A: Avogadro's number ($6.023 \times 10^{23}$),
s: molecular sectional area ($16.2 \times 10^{-20}$) occupied by $N_2$ molecule at liquid nitrogen temperature, and
M: molecular weight of $N_2$ (28.0134).

Measurement of Pore Volume Using Toluene

The toluene saturation adsorption of a zeolite at 60° C. was measured. Using the value, the total volume of the pores having diameters of 10 Å or smaller, possessed by the zeolite was determined from the following formula.

Pore volume (cc/g) of zeolite as measured using toluene=toluene saturation adsorption (g/g)/toluene density (0.866 g/cc)

Incidentally, the toluene saturation adsorption was measured according to the following procedure.

(1) A zeolite whose pore volume was to be measured using toluene, was supported on a cordierite honeycomb structure (a product of NGK Insulators, Ltd. having a partition wall thickness of 6 mil, a cell density of 400 cells/$in^2$ and an external size of 1 in. (diameter)×2 in. (length)) in an amount of 0.16 g per cc of the honeycomb structure.

Figure 2:
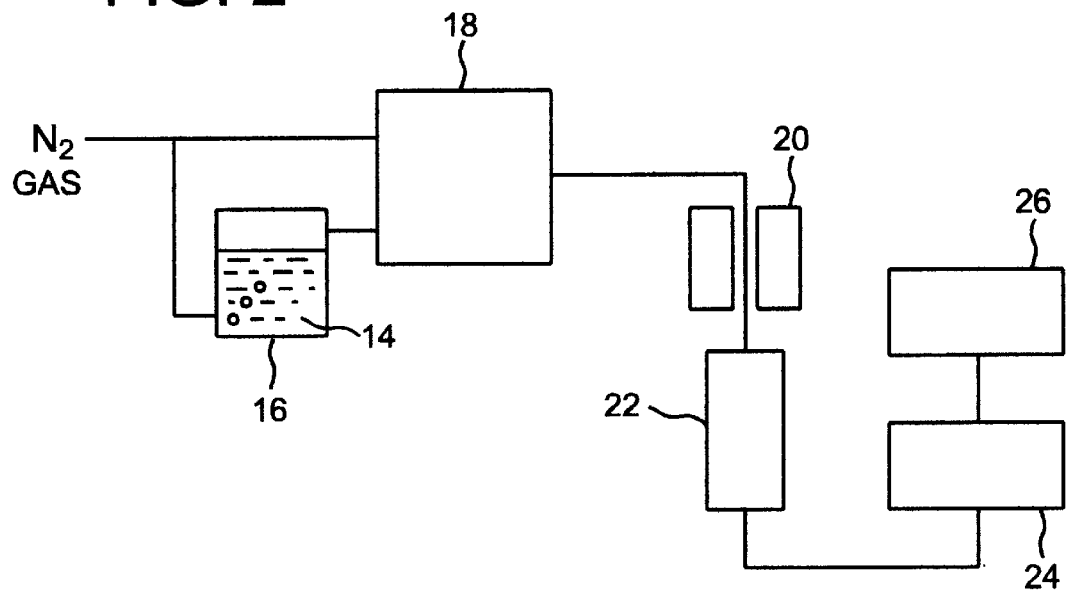
FIG. 2 is a schematic drawing showing the apparatus used for measurement of the toluene saturation adsorption of zeolite.

(2) Using an apparatus shown in FIG. 2, a mixed gas consisting of 3% of toluene and 97% of $N_2$ was passed through the zeolite-supported honeycomb structure prepared above, at 60° C. at a flow rate of 17 l/min. In this condition, the toluene concentrations before and after the passing of the mixed gas through the zeolite-supported honeycomb structure were measured (P/Ps= 0.2 in measurement of the following Examples). In FIG. 2, 16 is a toluene/$N_2$ mixer in which toluene 14 as a solvent is housed; 18 is a gas mixer for producing a gas of desired composition; 20 is a heater for controlling the temperature of the produced gas; 22 is a zeolite-supported honeycomb structure; 24 is an analyzer; and 26 is a computer.

(3) The measurement of toluene concentrations was terminated 5 minutes after the toluene concentration after the passing of the mixed gas through the zeolite-supported honeycomb structure became the same as that before the passing of the mixed gas through the zeolite-supported honeycomb structure.

(4) Using the toluene concentration A (ppmC) before the passing of the mixed gas through the zeolite-supported honeycomb structure and the toluene concentration B (ppmC) after the passing of the mixed gas through the zeolite-supported honeycomb structure, the toluene saturation adsorption was determined from the following formula.

Toluene saturation adsorption (g/g) =

$$\sum_{n=1}^{m} 17(1/\min) \times (1/60)(\min/\sec) \times (1/22.4)(1/l) \times (273+25)/273 \times$$

$92(g) \times$ ([toluene concentration difference $(A - B)$ at $n$ seconds from the start of measurement]) $(ppmC) \times (1/7)/(1 \times 10^6)$ In the above measurement of the pore volume of zeolite using $N_2$ or toluene, strictly speaking, the obtained pore volume is slightly (about 1% or less) larger than the true pore volume because $N_2$ or toluene is adsorbed also on the surfaces of zeolite particles. However, at least 99% of the obtained pore volume is the true volume of pores having diameters of 10 Å or less and accordingly the obtained pore volume may be regarded substantially as the pore volume of zeolite. Hence, the value obtained by the above measurement was per se used as the pore volume of zeolite. Incidentally, P/Ps=0.301 in toluene and P/Ps=0.2 in toluene; therefore, it is considered that there occurs no adsorption of HC between zeolite particles.

The present invention is described below in more detail by way of Examples. However, the present invention is not restricted to these Examples. The details of various zeolites used in the following adsorbents and adsorbent-catalysts in the Examples are shown in Table 1.

TABLE 1

| Kind of zeolite | Kind of ion | SiO$_2$/Al$_2$O$_3$ molar ratio | Pore diameter(s) (Å) | Pore volume as measured using N$_2$ (cc/g) (*1) | Pore volume as measured using toluene (cc/g) (*3) |
|---|---|---|---|---|---|
| β-zeolite | H$^+$ | 150 | 5.5 × 5.5, 7.6 × 6.4 | 0.304 | 0.160 |
| USY | H$^+$ | 390 | 7.4 × 7.4 | 0.380 | 0.250 |
| ZSM-5 | H$^+$ | 234 | 5.3 × 5.6, 5.1 × 5.5 | 0.191 | 0.092 |
| Mordenite | H$^+$ | 220 | 6.5 × 7.0 | 0.253 | 0.100 |
| SAPO(*1) | H$^+$ | 34 | 3.8 × 3.8 | 0.244 | 0.000 |

(*1) Silicoaluminophosphate
(*2),(*3) Pore volume per unit weight (Production of Adsorbents)

To each of the commercial zeolite powders shown in Table 1 were added an alumina sol having an alumina solid content of 2.5% by weight and water. The mixture was subjected to wet pulverization for 20 hours in a ball mill to prepare a slurry. In this slurry was immersed a cordierite honeycomb structure produced by NGK Insulators, Ltd. as specified in Table 2 to coat the honeycomb structure with a given amount of a zeolite. The resulting material was dried and then fired in air at 550° C. to obtain adsorbents 1 to 8 shown in Table 2.

To a commercial γ-Al$_2$O$_3$ having a specific surface area of 200 m$^2$/g were added cerium acetate and cerium oxide in an amount of 30% by weight in terms of oxide. The resulting mixture was subjected to wet pulverization, drying and calcination at 550° C. to obtain a γ-Al$_2$O$_3$·CeO$_2$ compound oxide. This oxide was impregnated with Pd by the use of an aqueous (NH$_4$)$_3$PdCl$_2$ solution. The resulting material was dried and then fired at 500° C. to obtain a Pd-supported Al$_2$O$_3$·CeO$_2$ compound oxide (catalyst component). To this

TABLE 2

| | Zeolite used | Amount of supported zeolite (g/cc) | Size of honeycomb (✕1) | Volume of honeycomb (cc) | Structure of honeycomb (✕2) | Blowing-through hole (✕3) | GSA of honeycomb Per unit volume (cm$^2$/cm$^3$) | Total (cm$^2$) | Pore volume of zeolite Volume "a" as measured using N$_2$ (cc) | Volume "b" as measured using toluene (cc) |
|---|---|---|---|---|---|---|---|---|---|---|
| Adsorbent 1 | β-zeolite | 0.10 | 14.3–25 | 4013 | 10/300 | No | 22.6 | 90694 | 122.00 | 64.21 |
| Adsorbent 2 | ZSM-5 | 0.10 | 11.8–5 | 548 | 10/300 | No | 22.6 | 12385 | 10.47 | 5.04 |
| Adsorbent 3 | Mordenite | 0.13 | 11.8–20 | 2190 | 10/300 | No | 22.6 | 49494 | 72.03 | 28.47 |
| Adsorbent 4 | β-zeolite, ZSM-5 (50:50) | 0.20 | 14.3–15 | 2404 | 10/300 | Yes (2.5). | 22.6 | 54330 | 119.24 | 60.58 |
| Adsorbent 5 | β-zeolite, ZSM-5 (50:50) | 0.10 | 14.3–17.5 | 2809 | 10/300 | No | 22.6 | 63483 | 69.66 | 35.39 |
| Adsorbent 6 | ZSM-5,USY (50:50) | 0.10 | 11.8–15 | 1640 | 10/300 | No | 22.6 | 37064 | 46.90 | 28.04 |
| Adsorbent 7 | β-zeolite | 0.18 | 14.3–25 | 4013 | 10/300 | No | 22.6 | 90694 | 219.59 | 115.57 |
| Adsorbent 8 | ZSM-5 | 0.04 | 11.8–5 | 548 | 10/300 | No | 22.6 | 12385 | 4.19 | 2.02 |

(✕1) Diameter (cm)-length (cm)
(✕2) Partition wall thickness (mil)/cell density (cells/in$^2$)
(✕3) "Yes" indicates that there is a blowing-through hole formed in the center of honeycomb in the axial direction.
A value in parenthesis refers to the diameter (cm) of the blowing-through hole.

(Production of Adsorbent-catalysts)

Adsorbents were produced in a procedure similar to the one described in the above (Production of adsorbents). On each of the adsorbents was supported a catalyst component in the following procedure, whereby were produced adsorbent-catalysts 1 to 8 each comprising a monolithic carrier, a first layer (inner layer) having a HC adsorbability, formed on the monolithic carrier, and a second layer (outer layer) having a three-way catalytic activity, formed on the first layer.

compound oxide was added small amounts of water and acetic acid to prepare a slurry. Each of the adsorbents produced above was immersed in this slurry to allow the adsorbent to support thereon the catalyst component in an amount of 0.10 g per cc of the honeycomb structure. The resulting material was fired at 500° C. to obtain adsorbent-catalysts 1 to 8 shown in Table 3. Incidentally, the total amount of Pd supported was 100 g per ft$^3$ of the honeycomb structure.

TABLE 3

| | Zeolite used | Amount of supported zeolite (g/cc) | Size of honeycomb (※1) | Volume of honeycomb (cc) | Structure of honeycomb (※2) | Blowing-through hole (※3) | GSA of honeycomb Per unit volume ($cm^2/cm^3$) | GSA of honeycomb Total ($cm^2$) | Pore volume of zeolite Volume "a" as measured using $N_2$ (cc) | Pore volume of zeolite Volume "b" as measured using toluene (cc) |
|---|---|---|---|---|---|---|---|---|---|---|
| Adsorbent-Catalyst 1 | β-zeolite | 0.11 | 11.8–20 | 2190 | 6/400 | No | 27.7 | 60663 | 73.23 | 38.54 |
| Adsorbent-Catalyst 2 | β-zeolite | 0.13 | 11.8–20 | 2092 | 6/400 | Yes (3.3) | 27.7 | 57948 | 82.68 | 43.51 |
| Adsorbent-Catalyst 3 | β-zeolite | 0.05 | 11.8–15 | 1567 | 6/400 | Yes (2.5) | 27.7 | 43406 | 23.82 | 12.54 |
| Adsorbent-Catalyst 4 | ZSM-5 | 0.15 | 11.8–15 | 1640 | 6/400 | No | 27/7 | 45428 | 46.99 | 22.63 |
| Adsorbent-Catalyst 5 | β-zeolite,ZSM-5 (50:50) | 0.08 | 11.8–25 | 2614 | 10/300 | Yes (3.3) | 22.6 | 59076 | 51.86 | 26.35 |
| Adsorbent-Catalyst 6 | β-zeolite,SAPO (80:20) | 0.10 | 11.8–10 | 1046 | 10/300 | Yes (3.8) | 22.6 | 23640 | 30.54 | 13.39 |
| Adsorbent-Catalyst 7 | β-zeolite | 0.25 | 11.8–20 | 2092 | 6/400 | Yes (2.5) | 27.7 | 57948 | 158.99 | 83.68 |
| Adsorbent-Catalyst 8 | β-zeolite,ZSM-5 (50:50) | 0.03 | 11.8–100 | 1096 | 10/300 | No | 22.6 | 24770 | 8.15 | 4.14 |

(※1) Diameter (cm)-length (cm)
(※2) Partition wall thickness (mil)/cell density (cells/in$^2$)
(※3) "Yes" indicates that there is a blowing-through hole formed in the center of honeycomb in the axial direction.
A value in parenthesis refers to the diameter (cm) of the blowing-through hole.

(Production of Catalysts)

A commercial γ-$Al_2O_3$ having a specific surface area of 200 m$^2$/g was impregnated with Pd or Rh by the use of an aqueous $(NH_4)_3PdCl_2$ solution or an aqueous $Rh(NO_3)_3$ solution. The resulting material was dried and then fired at 500° C. to obtain a Pd-supported $Al_2O_3$ powder and a Rh-supported $Al_2O_3$ powders. To each of these noble metal-supported $Al_2O_3$ powder were added appropriate amounts of water and acetic acid. To the Pd-supported $Al_2O_3$ powder was further added 30% by weight of $CeO_2$. Each mixture was subjected to wet pulverization to produce two kinds of slurries, i.e. a Pd-supported $Al_2O_3.CeO_2$ slurry and a Rh-supported $Al_2O_3$ slurry. Of them, the Pd-supported $Al_2O_3.CeO_2$ slurry was supported on a cordierite honeycomb structure manufactured by NGK Insulators, ltd. (diameter: 3.66 in., volume: 0.6 l, partition wall thickness: 6 mil, cell density: 400 cells/in.$^2$) in an amount of 0.10 g per cc of the honeycomb structure. The supported honeycomb structure was fired at 500° C. to obtain catalyst A (Pd catalyst).

In the same manner as in production of catalyst A, the Pd-supported $Al_2O_3.CeO_2$ slurry was supported on the same cordierite honeycomb structure. Thereon was supported the Rh-supported $Al_2O_3$ slurry. The resulting material was fired at 500° C. to produce catalyst B (Pd—Rh catalyst) having two catalyst layers.

Catalyst C (Pt—Rh catalyst) having two catalyst layers was produced in the same manner as in production of catalyst B except that (1) the Pd-supported $Al_2O_3.CeO_2$ slurry was replaced by a Pt-supported $Al_2O_3.CeO_2$ slurry produced by using an aqueous $H_2PtCl_2$ solution and (2) the honeycomb structure was replaced by a cordierite honeycomb structure manufactured by NGK Insulators, ltd. (diameter: 4.66 in., volume: 2.0 l, partition wall thickness: 6 mil, cell density: 400 cells/in.$^2$).

(Aging of Adsorbents, Adsorbent-catalysts and Catalysts)

Each of the adsorbents, adsorbent-catalysts and catalysts produced above was disposed in an exhaust pipe of a commercial engine at such an exhaust pipe site as the exhaust gas temperature at the inlet of the adsorbent, adsorbent-catalyst or catalyst became 850° C. Then, the engine was operated for total 100 hours in a fuel-cut mode to subject the adsorbent, adsorbent-catalyst or catalyst to aging. The fuel-cut mode was such that the engine was operated for 60 seconds in the vicinity of a stoichiometric point (A/F=14.4) and then fuel supply was cut for 5 seconds to shift the exhaust gas to a fuel-lean side.

(Measurement of HC Emitted From Engine During 140 Seconds From Engine Start When Engine Was Operated in LA-4 Mode)

For each of a test vehicle (test vehicle A) having a L4 type engine of 2,000 cc displacement and a test vehicle (test vehicle B) having a V6 type engine of 3,800 cc displacement, there were measured the amount of HC emitted from the engine during the 140 seconds from the start of engine or during Bag-1 when the engine was operated in accordance with the LA-4 mode of FTP. Incidentally, in this measurement was disposed, in the engine exhaust pipe, a cordierite honeycomb structure (diameter: 118 mm, length: 200 mm) having neither zeolite nor catalyst supported thereon, in order to allow the pressure loss seen during the measurement, to resemble those appearing when the systems of Examples and Comparative Examples were used. The results of measurement are shown in Table 4.

TABLE 4

| | Model | Displacement (cc) | HC emission c during 0–140 sec (g) | HC emission during Bag-1 (g) |
|---|---|---|---|---|
| Test vehicle A | 1988 | 2000 | 2.9 | 6.9 |
| Test vehicle B | 1995 | 3800 | 2.3 | 6.7 |

(Evaluation of Systems for Exhaust Gas Purification)

In the exhaust pipe of test vehicle A or test vehicle B were disposed catalyst B (4), an adsorbent or adsorbent-catalyst (2), catalyst A (6) and catalyst C (8) in this order, starting from an exhaust pipe point distant from the exhaust manifold of engine by 600 mm (test vehicle A) or 1,000 mm (test vehicle B), as shown in FIG. 1, whereby systems for exhaust gas purification of Examples 1–12 and Comparative Examples 1–4 were constituted. Incidentally, all of the adsorbents, the adsorbent-catalysts and the catalysts used had been subjected to aging as mentioned previously. Secondary air inlets (10) and (12) were made at the exhaust pipe points of 100 mm upstream of catalyst B (4) and downstream of catalyst B (4), respectively.

Using an air pump, secondary air was introduced from the secondary air inlet (10) at a rate of 80 l/min for 70 seconds from the start of engine and from the secondary air inlet (12) at a rate of 50 l/min for 180 seconds from the timing when 70 seconds had passed from the engine start. In this state, a test according to the LA-4 mode of FTP of U.S. was conducted. The HC emission obtained in each system during the Bag-1 of FTP (cold transient period, 505 seconds from engine start) is shown in Table 5.

and c is a total amount of hydrocarbons emitted from the engine during a period of 140 seconds from the start of the engine when the engine is operated in accordance with the LA-4 mode of FTP.

2. A system for exhaust gas purification disposed in an exhaust pipe of an internal combustion engine, said system comprising an exhaust pipe for an internal combustion engine and installed therein a zeolite as adsorbent component capable of adsorbing hydrocarbons present in an exhaust gas emitted from the engine and a catalyst capable of reducing harmful substances present in the exhaust gas, which system satisfies the following condition:

$$b/c = 2 \text{ to } 30 \text{ cc/g}$$

wherein b is total volume of the pores of diameters of 10 Å or smaller possessed by the zeolite as measured using

TABLE 5

| | | Pore volume of zeolite | | Pore volume/HC emission when test vehicle A was used | | Pore volume/HC emission when test vehicle B was used | | HC emission during Bag-1 | |
|---|---|---|---|---|---|---|---|---|---|
| | Adsorbent or adsorbent-catalyst used in system | Volume "a" as measured using $N_2$ (cc) | Volume "b" as measured using toluene (cc) | a/c (cc/g) | b/c (cc/g) | a/c (cc/g) | b/c (cc/g) | When test vehicle A was used (g) | When test vehicle B was used (g) |
| Example 1 | Adsorbent 1 | 122.00 | 64.21 | 42.07 | 22.14 | 53.04 | 27.92 | 0.998 | 0.901 |
| Example 2 | Adsorbent-catalyst 1 | 73.23 | 38.54 | 25.25 | 13.29 | 31.84 | 16.76 | 0.776 | 0.723 |
| Example 3 | Adsorbent-catalyst 2 | 82.68 | 43.51 | 28.51 | 15.00 | 35.95 | 18.92 | 0.623 | 0.582 |
| Example 4 | Adsorbent-catalyst 3 | 23.82 | 12.54 | 8.21 | 4.32 | 10.36 | 5.45 | 0.89 | 0.698 |
| Example 5 | Adsorbent-catalyst 4 | 46.99 | 22.63 | 16.20 | 7.80 | 20.43 | 9.84 | 0.583 | 0.611 |
| Example 6 | Adsorbent 2 | 10.47 | 5.04 | 3.61 | 1.74 | 4.55 | 2.19 | 0.987 | 1.023 |
| Example 7 | Adsorbent 3 | 72.03 | 28.47 | 24.84 | 9.82 | 31.32 | 12.38 | 0.874 | 0.853 |
| Example 8 | Adsorbent-catalyst 5 | 51.86 | 26.35 | 17.88 | 9.09 | 22.55 | 11.46 | 0.51 | 0.608 |
| Example 9 | Adsorbent 4 | 119.24 | 60.58 | 41.12 | 20.89 | 51.84 | 26.34 | 0.875 | 0.868 |
| Example 10 | Adsorbent 5 | 69.66 | 35.39 | 24.02 | 12.20 | 30.29 | 15.39 | 0.61 | 0.683 |
| Example 11 | Adsorbent 6 | 46.90 | 28.04 | 16.17 | 9.67 | 20.39 | 12.19 | 0.701 | 0.844 |
| Example 12 | Adsorbent-catalyst 6 | 30.54 | 13.39 | 10.53 | 4.62 | 13.28 | 5.82 | 0.588 | 0.555 |
| Comparative Example 1 | Adsorbent 7 | 219.59 | 115.57 | 75.72 | 39.85 | 95.47 | 50.25 | 1.024 | 1.133 |
| Comparative Example 2 | Adsorbent-catalyst 7 | 158.99 | 83.68 | 54.82 | 28.86 | 69.13 | 36.38 | 0.895 | 1.022 |
| Comparative Example 3 | Adsorbent-catalyst 8 | 8.15 | 4.14 | 2.81 | 1.43 | 3.55 | 1.80 | 1.101 | 1.283 |
| Comparative Example 4 | Adsorbent 8 | 4.19 | 2.02 | 1.44 | 0.70 | 1.82 | 0.88 | 1.227 | 1.388 | a: The total volume of the pores of diameters of 10 Å or smaller possessed by zeolite, as measured using $N_2$.
b: The total volume of the pores of diameters of 10 Å or smaller possessed by zeolite, as measured using toluene.
c: The amount of HC emitted from the engine of the test vehicle A or B during the first 140 seconds from the start of the engine when the engine is operated in accordance with the LA-4 mode of FTP. It is 2.9 g in the test vehicle A and 2.3 g in the test vehicle B.

As shown in Table 5, favorable HC emissions were obtained in the exhaust gas purification systems of Examples 1–12 according to the present invention.

As described above, the system for exhaust gas purification according to the present invention can effectively purify the harmful substances present in the exhaust gas emitted from an internal combustion engine, particularly the HC discharged in a large amount during the cold start of the engine.

What is claimed is:

1. A system for exhaust gas purification disposed in an exhaust pipe of an internal combustion engine, said system comprising an exhaust pipe for an internal combustion engine and installed therein a zeolite as adsorbent component capable of adsorbing hydrocarbons present in an exhaust gas emitted from the engine and a catalyst capable of reducing harmful substances present in the exhaust gas, which system satisfies the following condition:

$$a/c = 3 \text{ to } 50 \text{ cc/g}$$

wherein a is a total volume of the pores of diameters of 10 Å or smaller possessed by the zeolite as measured using $N_2$, toluene, and c is a total amount of the hydrocarbons emitted from the engine during a period of 140 seconds from the start of the engine when the engine is operated in accordance with the LA-4 mode of FTP.

3. A system for exhaust gas purification disposed in an exhaust pipe of an internal combustion engine, said system comprising an exhaust pipe for an internal combustion engine and installed therein a zeolite as adsorbent component capable of adsorbing hydrocarbons present in an exhaust gas emitted from the engine and a catalyst capable of reducing harmful substances present in the exhaust gas, which system satisfies the following conditions:

$$a/c = 3 \text{ to } 50 \text{ cc/g}$$

$$b/c = 2 \text{ to } 30 \text{ cc/g}$$

wherein a is a total volume of the pores of diameters of 10 Å or smaller possessed by the zeolite as measured using $N_2$, b is a total volume of the pores of diameter of 10 Å or smaller possessed by the zeolite as measured using toluene, and c is a total amount of hydrocarbons emitted from the engine during a period of 140 seconds from the start of the engine when the engine is operated in accordance with the LA-4 mode of FTP.

4. A system for exhaust gas purification according to claim 1, wherein the zeolite used as an adsorbent component is disposed in the exhaust pipe in the form of an adsorbent which comprises a monolithic carrier and a zeolite supported on the carrier.

5. A system for exhaust gas purification according to claim 4, wherein a volume of the monolithic carrier is 0.5–4 l.

6. A system for exhaust gas purification according to claim 4, wherein a geometrical surface area of the monolithic carrier is 10,000–100,000 cm$^2$.

7. A system for exhaust gas purification according to claim 4, wherein the zeolite supported on the monolithic carrier contains therein a catalyst component having a purifiability for harmful substances present in the exhaust gas or has thereon a layer containing a catalyst component having a purifiability for harmful substances present in the exhaust gas.

8. A system for exhaust gas purification according to claim 1, wherein the catalyst comprises a monolithic carrier and a catalyst layer supported on the carrier, containing a catalyst component having a purifiability for harmful substances present in the exhaust gas.

9. A system for exhaust gas purification according to claim 4, wherein downstream of the adsorbent is disposed at least one catalyst which comprises a monolithic carrier and a catalyst layer supported on the carrier, containing a catalyst component having a purifiability for the harmful substances present in the exhaust gas.

10. A system for exhaust gas purification according to claim 4, wherein the adsorbent has therein a blowing-through hole having a diameter larger than those of the passages (cells) of the monolithic carrier.

11. A system for exhaust gas purification according to claim 9, wherein a ratio of (1) a volume of the catalyst disposed downstream of the adsorbent and (2) a volume of the adsorbent is (1):(2)=1:1 to 1:15.

12. A system for exhaust gas purification according to claim 4, wherein upstream of the adsorbent is disposed at least one catalyst which comprises a monolithic carrier and a catalyst layer supported on the carrier, containing a catalyst component having a purifiability for the harmful substances present in the exhaust gas.

13. A system for exhaust gas purification according to claim 1, wherein the zeolite used as an adsorbent component has a $SiO_2/Al_2O_3$ molar ratio of 50 or more.

14. A system for exhaust gas purification according to claim 1, wherein the zeolite used as an adsorbent component contains therein at least one noble metal selected from Pt, Pd and Rh.

15. A system for exhaust gas purification according to claim 1, wherein the zeolite used as an adsorbent component contains therein at least one ion selected from the ions of the group IB elements (Cu, Ag and Au) of periodic table.

16. A system for exhaust gas purification according to claim 15, wherein the zeolite used as an adsorbent component further contains therein at least one ion selected from the ions of Mg, Ca, Sr, Ba, Y, La, Ti, Ce, Mn, Fe, Co, Cr, Ni and Zn.

17. A system for exhaust gas purification according to claim 1, wherein the zeolite used as an adsorbent component is at least one of ZSM-5, γ-zeolite, USY and mordenite.

18. A system for exhaust gas purification according to claim 1, wherein the catalyst comprises a heat-resistant oxide and at least one noble metal selected from Pt, Pd and Rh, supported on the heat-resistant oxide.

* * * * *